Nov. 20, 1945.  H. S. OTT ET AL  2,389,323
ANNUNCIATOR SYSTEM
Filed March 6, 1944
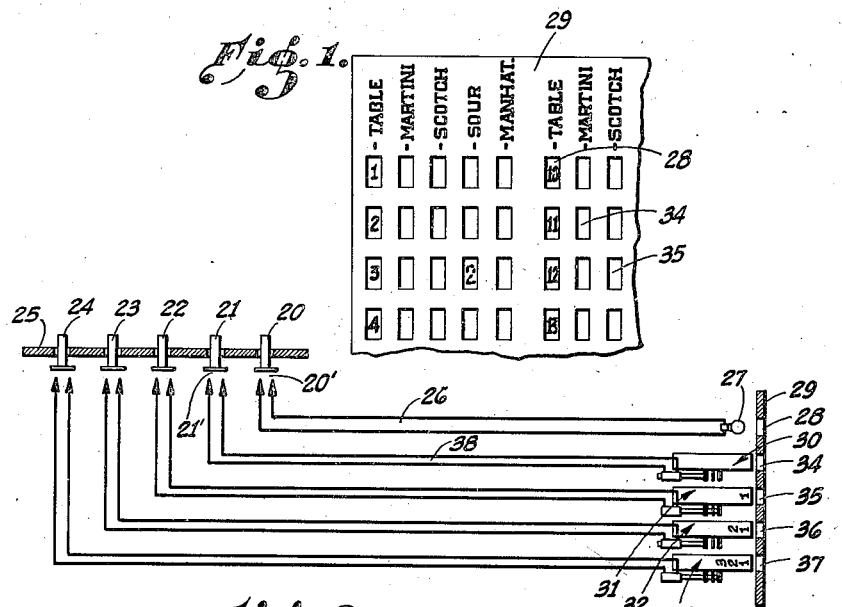
Fig. 1.
Fig. 2.
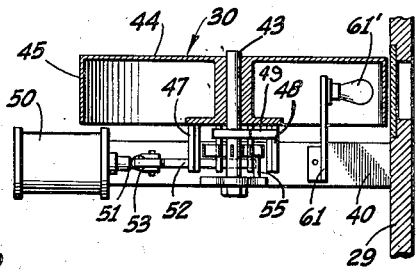
Fig. 4.
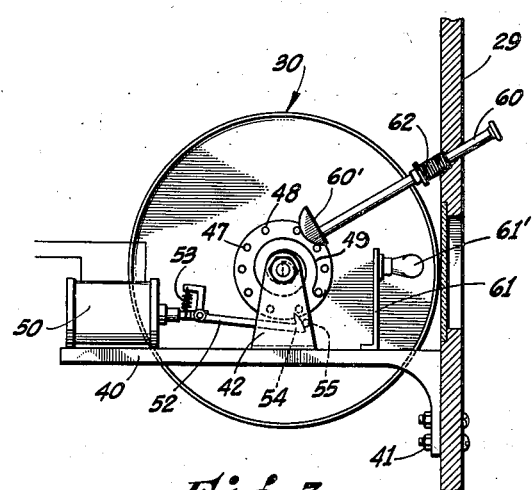
Fig. 3.
HERMAN S. OTT &
PRESTON W. COOMBS,
INVENTORS.
BY
ATTORNEY.

Patented Nov. 20, 1945

2,389,323

UNITED STATES PATENT OFFICE 2,389,323

ANNUNCIATOR SYSTEM

Herman Stewart Ott, Rosemead, and Preston W. Coombs, Los Angeles, Calif.

Application March 6, 1944, Serial No. 525,134

3 Claims. (Cl. 177—338)

This invention pertains to means and methods whereby patrons may automatically convey orders for desired objects, drinks, items of food or the like, both as to number of items and type of item desired, to a dispensing station where such items may be prepared for delivery to patrons seated at a particular table. The invention is particularly adapted for use in restaurants, lunch rooms, cocktail bars and other places dispensing food and drinks.

Generally stated, the invention contemplates a system in which each table, booth or specified locale, identified by a given number, letter or the like, is provided with a selector which may be operated by the patron. The selector includes means for closing electrical circuits which operate indicating indicia forming a part of an annunciator board, located at the bar, pantry or kitchen of the establishment. The desires of the patrons are thus made known at the distributing center and it is not necessary for waiters to spend alrge amounts of time in taking an order and then delivering the order to the table or booth.

An object of the present invention, therefore, is to disclose and provide an automatic selector system associated with the annunciator board whereby the annunciator board selectively indicates the origin of the request, the items requested and the number of each of said items.

A further object of the present invention is to disclose and provide a simple and efficient means for operating a selective annunciator board.

These and other objects of the present invention will become apparent from the following description of an exemplary form of device which may be used in attaining the objects of this invention. The exemplary form is illustrated in the appended drawing, in which:

Fig. 1 is a front elevation of a portion of an annunciator board.

Fig. 2 is a wiring diagram, illustrating the operative circuits.

Fig. 3 is a side elevation of one of the indicating means.

Fig. 4 is a plan view partly in section of the device shown in Fig. 3.

The illustrative arrangement is particularly adapted for use in a bar, cocktail lounge or the like, provided with a plurality of tables or booths. Each table or booth is provided with a selector which may be a dial type of instrument or a simple housing provided with a plurality of push buttons, such as the push buttons 20–24, shown movably supported by the housing 25. The button 20 may be marked with the table number, whereas other buttons, such as 21–24 may be marked with the names of various beverages, such as, for example, Martinis, Scotch, Manhattans, etc. A patron, after having seated himself, may depress the desired button to indicate an order for the beverage marked on or adjacent such button. In accordance with the present invention, the number of orders of such item is indicated by the number of times that the patron depresses the button.

The annunciator board 29, positioned in a pantry or at the bar, may include a series of ports corresponding to the number of tables or booths in the establishment. Adjacent each of such ports is another series of ports, corresponding in number to the number of items being dispensed or to the number of buttons carried by each selector 25. As shown in Fig. 1, the annunciator board 29 may carry vertical rows of ports, the first row indicating table numbers, the second row being entitled Martinis, the third Scotch, fourth Whiskey Sours, fifth Manhattans, etc. The ports indicating tables may carry transparent or translucent plates bearing table numbers. The other ports may be either open or they may be provided with transparent windows.

Fig. 2 shows a section through the annunciator board 29 and a row of apertures 28, 34, 35, 36 and 37. The port 28 may be the window bearing a table number. Behind the annunciator board and in operative relation to the window 28 is a light source 27 connected as by means of leads 26 to terminals beneath the button 20. When the button 20 is depressed so as to close the circuit at 20' the light source is illuminated, thereby calling the attention of the pantry man or bartender to the fact that the table whose number appears at 28 desires attention.

In operative relation to the ports 34, 35, 36 and 37 are indicating devices 30, 31, 32 and 33 which are electrically associated with the buttons 21–24.

Each of these indicating devices, such as the device 30, may comprise a bracket 40 adapted to be attached to the rear of the annunciator board 29 as by machine screws 41 (see Figs. 3 and 4). Each bracket may be provided with an upstanding trunnion 42 carrying a stud 43 upon which there is journalled a drum 44 provided with the cylindrical flange 45. This cylindrical flange may carry a series of numbers from 1 to 8 or 10, which are used in indicating the number of a given item that a patron desires.

The drum 44 is also provided with a series of prongs 47, 48 and the like arranged in spaced relation around the stud shaft 43. A spring 49, having one end attached to the stud shaft and the other to one of the prongs, is arranged to normally return the drum 44 to a position in which a blank or zero carried by the periphery 45 of the drum is visible through the port or opening in the annunciator board 29 adjacent such drum.

Mounted upon the bracket 40 in operative relation is a solenoid having leads such as 38 leading to contacts or terminals immediately beneath an appropriately marked button on the selector. The solenoid is preferably provided with a movable armature 51 carrying a pivoted arm 52 which is normally maintained in axial alignment with the armature 51 as by means of a compression spring 53. The end of the pivoted arm 52 is provided with a hooked portion 54, the outer face of such hook being inclined and radially bearing against a stop pin 55 carried by the trunnion 42. When at rest, the arm 52 is against the stop pin 55 and the hooked end 54 does not contact the various prongs 47, 48, etc., extending from the drum 44. In the event the selector button is depressed so as to close the circuit to the solenoid 50, the armature 51 will be drawn into the solenoid (will move to the left in Fig. 3), thereby permitting a spring 53 to raise the end 54 of arm 52 into engagement with one of the prongs and causing a partial rotation of the drum 44.

The drum 44 will not return to its original position under the influence of a coiled spring by reason of a detent 69' carried by release pin 60 extending through the annunciator board 29. The detent 69' is yieldably urged towards the prongs 47, 48 etc., by means of a spring 62. As shown, the detent preferably rests against two of the prongs at any given time, thereby causing the drum 44 to rotate in steps, each step corresponding to the radial separation of the prongs and an increment corresponding to the area occupied by the numbers carried by the periphery 45 of the drum.

It will be evident therefore, that in the event the solenoid 50 is repeatedly energized as, for example, by two repeated closures of the circuit (such closures being caused by two successive depressions of the selector button associated with such solenoid) the drum will move two spaces and present the numeral (2) to the view of the bartender, pantry man or the like.

The periphery 45 of the drum need not be opaque and carry the numbers on its outer surface. Such periphery may be perforated and the numbers may take the form of cut outs. In such instance, it is desirable to have a light source 61' mounted upon a bracket 61 and capable of being energized whenever the selector buttons are depressed so as to eliminate the cut out and render it more easily visible to the bartender. If desired, the light sources 61' may be permanently illuminated.

By referring to Fig. 1, it will be noted that a numeral (2) is visible through the port in alignment with table 3, indicating that table 3 desires two Whiskey Sours.

After the order has been filled or has been delivered to the table, the bartender or pantry man may return the indicator to zero or inactive position by releasing the detent 61. This can be readily accomplished by pulling the knob on the detent shaft 60, causing the drum 44 to return to zero position under the influence of the spiral spring.

Those skilled in the electrical arts will readily appreciate that various changes and modifications may be made. A supply of current to the various circuits, as shown in Fig. 2, has not been indicated, since it is elementary that all of the circuits need be supplied with energy. As previously stated, dial type of contact closing devices, such as telephone dial circuits, may be used instead of the push button arrangement which has been diagrammatically illustrated.

All changes and modifications coming within the scope of the appended claims are embraced thereby.

We claim:

1. An annunciator mechanism comprising an electric circuit including a push button switch, a source of electric energy and a solenoid device adapted to be actuated by said electric energy, a rotatably mounted drum carrying a succession of characters, a series of prongs arranged in a circle about the axis of rotation of the drum corresponding in number and relative position to the characters, a spring-pressed detent having a head end adapted to be normally pressed into the space between adjacent prongs, a return mechanism adapted to return the drum to initial position upon manual release of the detent, and a hook member having an end engageable one at a time with the prongs and attached at the other end to the solenoid adapted thereby to rotate the drum one step at a time against the resistance of the detent.

2. An annunciator mechanism comprising an electric circuit including a push button switch, a source of electric energy and a solenoid device adapted to be actuated by said electric energy, an annunciator panel having a port therein, a rotatably mounted drum positioned in operating relation to the port carrying a succession of characters adapted to appear opposite the port, a series of prongs arranged in a circle about the axis of rotation of the drum corresponding in number and relative position to the characters, a spring-pressed detent extending through the panel having a head end adapted to be normally pressed into the space between adjacent prongs, a spring attached to the stationary portion of the mechanism and one of the prongs adapted to return the drum to initial position upon manual release of the detent, and a hook member having an end engageable one at a time with the prongs and attached at the other end to the solenoid adapted thereby to rotate the drum one step at a time against the resistance of the detent.

3. An annunciator mechanism comprising an electric circuit including a push button switch, a source of electric energy and a solenoid device adapted to be actuated by said electric energy, an annunciator panel having a port therein, a rotatably mounted drum positioned in operating relation to the port carrying a succession of characters adapted to appear opposite the port, a series of prongs arranged in a circle about the axis of rotation of the drum corresponding in number and relative position to the characters, a spring-pressed detent extending through the panel having a head end adapted to be normally pressed into the space between adjacent prongs, a spring attached to the stationary portion of the mechanism and one of the prongs adapted to return the drum to initial position upon manual release of the detent, and a hook member having an end engageable one at a time with the prongs and attached at the other end to the solenoid adapted thereby to rotate the drum one step at a time against the resistance of the detent, said hook member comprising end connected elements and a joint at said connection having a laterally extending arm on one element and a spring attached between said arm and the other element adapted normally to urge the hook elements into a straight line relationship.

HERMAN STEWART OTT.
PRESTON W. COOMBS.